United States Patent [19]

Patel

[11] Patent Number: 5,716,119
[45] Date of Patent: Feb. 10, 1998

[54] ROLLER BLADE LIGHTING SYSTEM

[76] Inventor: Vipesh Patel, 162 Wallis Drive, Peterborough Ontario, Canada, K9J6C3

[21] Appl. No.: 689,877

[22] Filed: Aug. 15, 1996

[51] Int. Cl.[6] .................................................. F21V 7/04
[52] U.S. Cl. .............................. 362/32; 362/61; 362/103
[58] Field of Search ............................... 362/32, 61, 103

[56] References Cited

U.S. PATENT DOCUMENTS

| | | | |
|---|---|---|---|
| 4,991,066 | 2/1991 | McCowan | 362/61 |
| 5,327,329 | 7/1994 | Stiles | 362/61 |
| 5,552,971 | 9/1996 | Madden | 362/32 |
| 5,588,734 | 12/1996 | Talamo et al. | 362/103 |

Primary Examiner—Carroll B. Dority

[57] ABSTRACT

A new Roller Blade Lighting System for providing a lighting system integrated with roller blades that protects the user by projecting light from the user's roller blades towards the drivers of motorized vehicles warning them of the user's presence. The inventive device includes a roller blade skate, a lighting means integrated within the roller blade skate, an electrical power source connected electrically to the lighting means and a motion switching means that controls the lighting means.

5 Claims, 3 Drawing Sheets

ROLLER BLADE LIGHTING SYSTEM

BACKGROUND OF THE INVENTION

1. Field of the Invention

The present invention relates to Roller Skate Lighting Devices and more particularly pertains to a new Roller Blade Lighting System for providing a lighting system integrated with roller blades that protects the user by projecting light from the user's roller blades towards the drivers of motorized vehicles warning them of the user's presence.

2. Description of the Prior Art

The use of Roller Skate Lighting Devices is known in the prior art. More specifically, Roller Skate Lighting Devices heretofore devised and utilized are known to consist basically of familiar expected and obvious structural configurations, notwithstanding the myriad of designs encompassed by the crowded prior art which have been developed for the fulfillment of countless objectives and requirements.

Known prior art Roller Skate Lighting Devices include U.S. Pat. No. 5,327,329; U.S. Pat. No. 5,413,380; U.S. Design Pat. 268,195; U.S. Pat. No. 5,278,733; U.S. Pat. No. 4,648,610 and U.S. Pat. No. 4,367,515.

While these devices fulfill their respective, particular objectives and requirements, the aforementioned patents do not disclose a new Roller Blade Lighting System. The inventive device includes a roller blade skate, a lighting means integrated within the roller blade skate, an electrical power source connected electrically to the lighting means and a motion switching means that controls the lighting means.

In these respects, the Roller Blade Lighting System according to the present invention substantially departs from the conventional concepts and designs of the prior art, and in so doing provides an apparatus primarily developed for the purpose of providing a lighting system integrated with roller blades that protects the user by projecting light from the user's roller blades towards the drivers of motorized vehicles warning them of the user's presence.

SUMMARY OF THE INVENTION

In view of the foregoing disadvantages inherent in the known types of Roller Skate Lighting Devices now present in the prior art, the present invention provides a new Roller Blade Lighting System construction wherein the same can be utilized or providing a lighting system integrated with roller blades that protects the user by projecting light from the user's roller blades towards the drivers of motorized vehicles warning them of the user's presence. The general purpose of the present invention, which will be described subsequently in greater detail, is to provide a new Roller Blade Lighting System apparatus and method which has many of the advantages of the Roller Skate Lighting Devices mentioned heretofore and many novel features that result in a new Roller Blade Lighting System which is not anticipated, rendered obvious, suggested, or even implied by any of the prior art Roller Skate Lighting Devices, either alone or in any combination thereof.

To attain this, the present invention generally comprises a roller blade skate, a lighting means integrated within the roller blade skate, an electrical power source connected electrically to the lighting means and a motion switching means that controls the lighting means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Roller Blade Lighting System apparatus and method which has many of the advantages of the Roller Skate Lighting Devices mentioned heretofore and many novel features that result in a new Roller Blade Lighting System which is not anticipated, rendered obvious, suggested, or even implied by any of the prior art Roller Skate Lighting Devices either alone or in any combination thereof.

It is another object of the present invention to provide a new Roller Blade Lighting System which may be easily and efficiently manufactured and marketed.

It is a further object of the present invention to provide a new Roller Blade Lighting System which is of a durable and reliable construction.

An even further object of the present invention is to provide a new Roller Blade Lighting System which is susceptible of a low cost of manufacture with regard to both materials and labor, and which accordingly is then susceptible of low prices of sale to the consuming public, thereby making such Roller Blade Lighting System economically available to the buying public.

Still yet another object of the present invention is to provide a new Roller Blade Lighting System which provides in the apparatuses and methods of the prior art some of the advantages thereof, while simultaneously overcoming some of the disadvantages normally associated therewith.

Still another object of the present invention is to provide a new Roller Blade Lighting System for providing a lighting system integrated with roller blades that protects the user by projecting light from the user's roller blades towards the drivers of motorized vehicles warning them of the user's presence.

Yet another object of the present invention is to provide a new Roller Blade Lighting System which includes a roller blade skate, a lighting means integrated within the roller blade skate, an electrical power source connected electrically to the lighting means and a motion switching means that controls the lighting means.

Even still another object of the present invention is to provide a new Roller Blade Lighting System wherein the user activates the lighting means by roller blading which warns the drivers of motorized vehicles of the user's presence.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
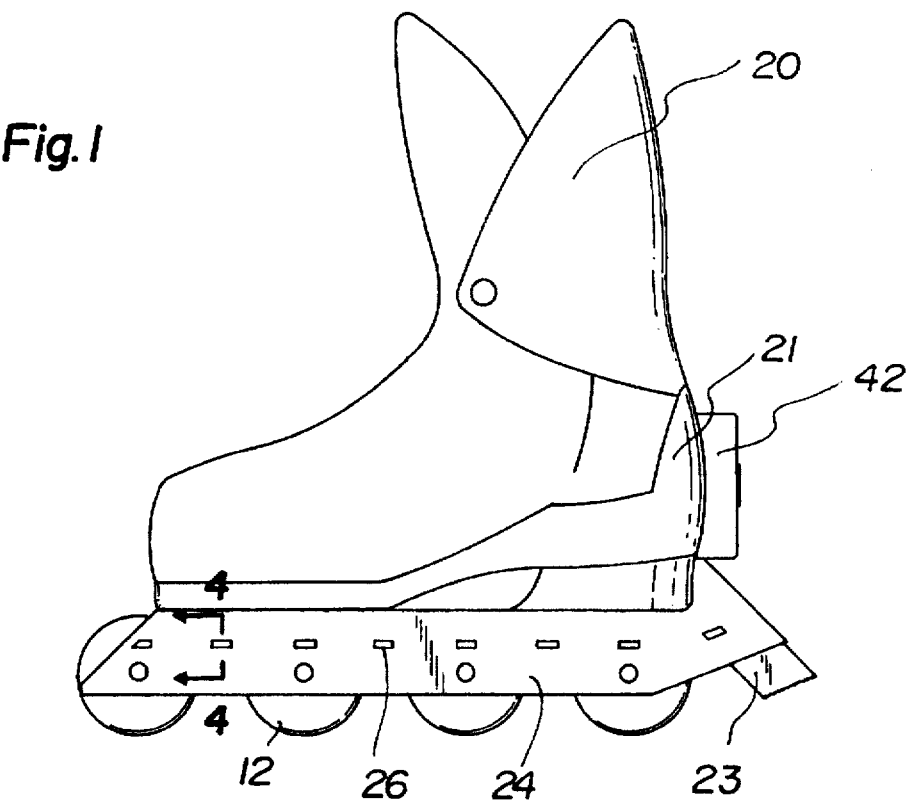
FIG. 1 is a left side view of a new Roller Blade Lighting System according to the present invention.
Figure 2:
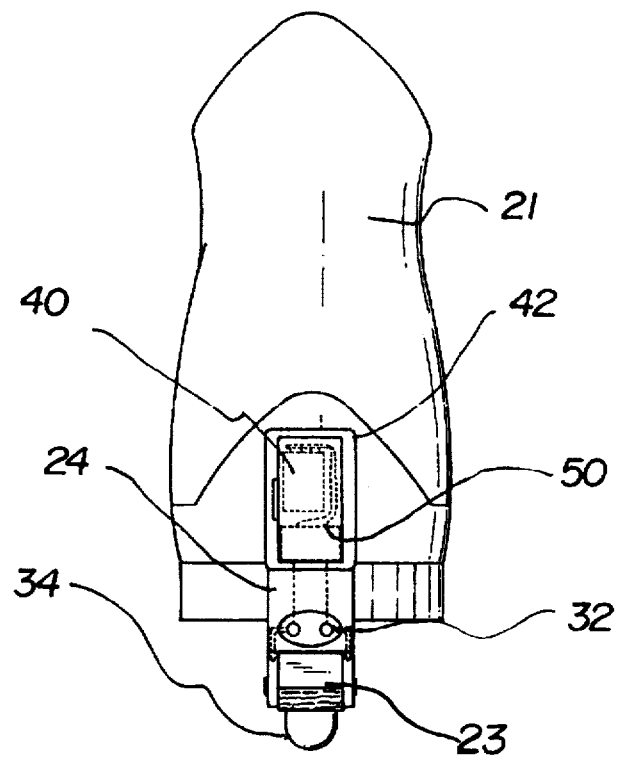
FIG. 2 is a rear view thereof.
Figure 3:
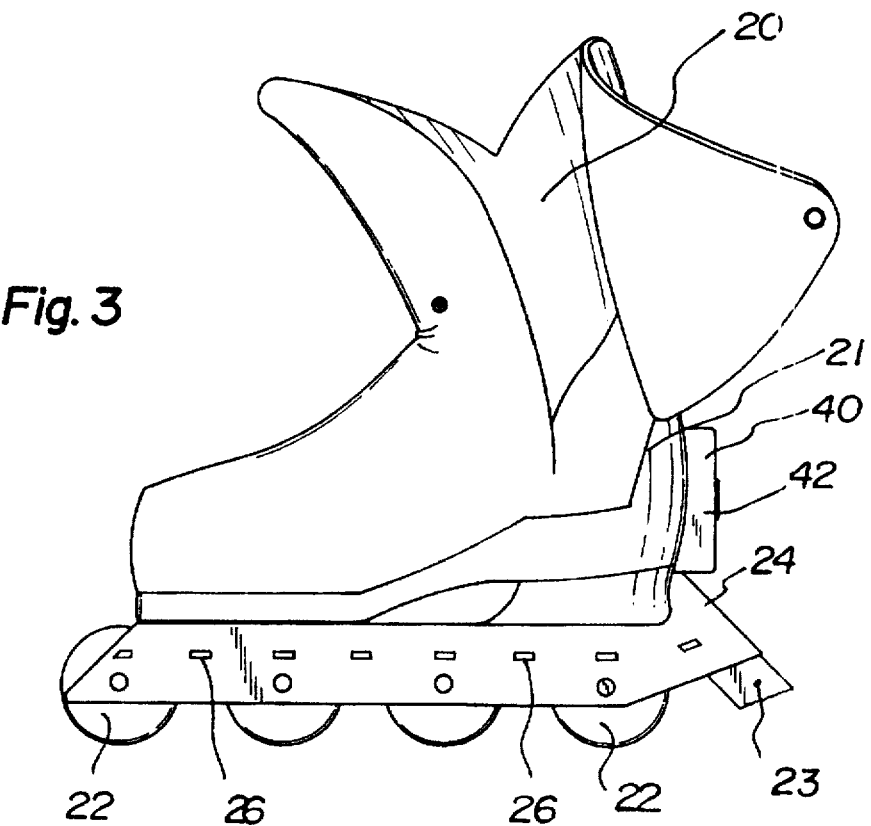
FIG. 3 is a side view of the present invention.
Figure 4:
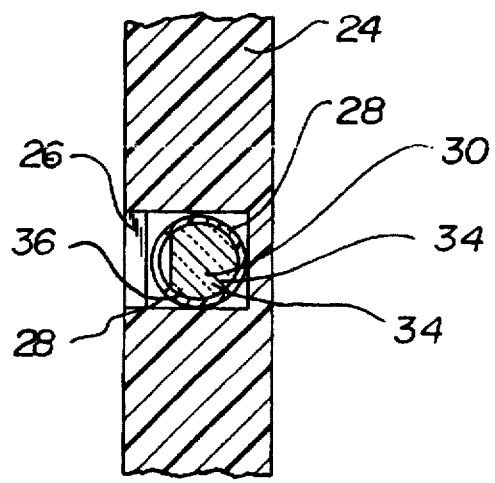
FIG. 4 is a cross sectional view taken along line 4—4 of FIG. 1.
Figure 5:
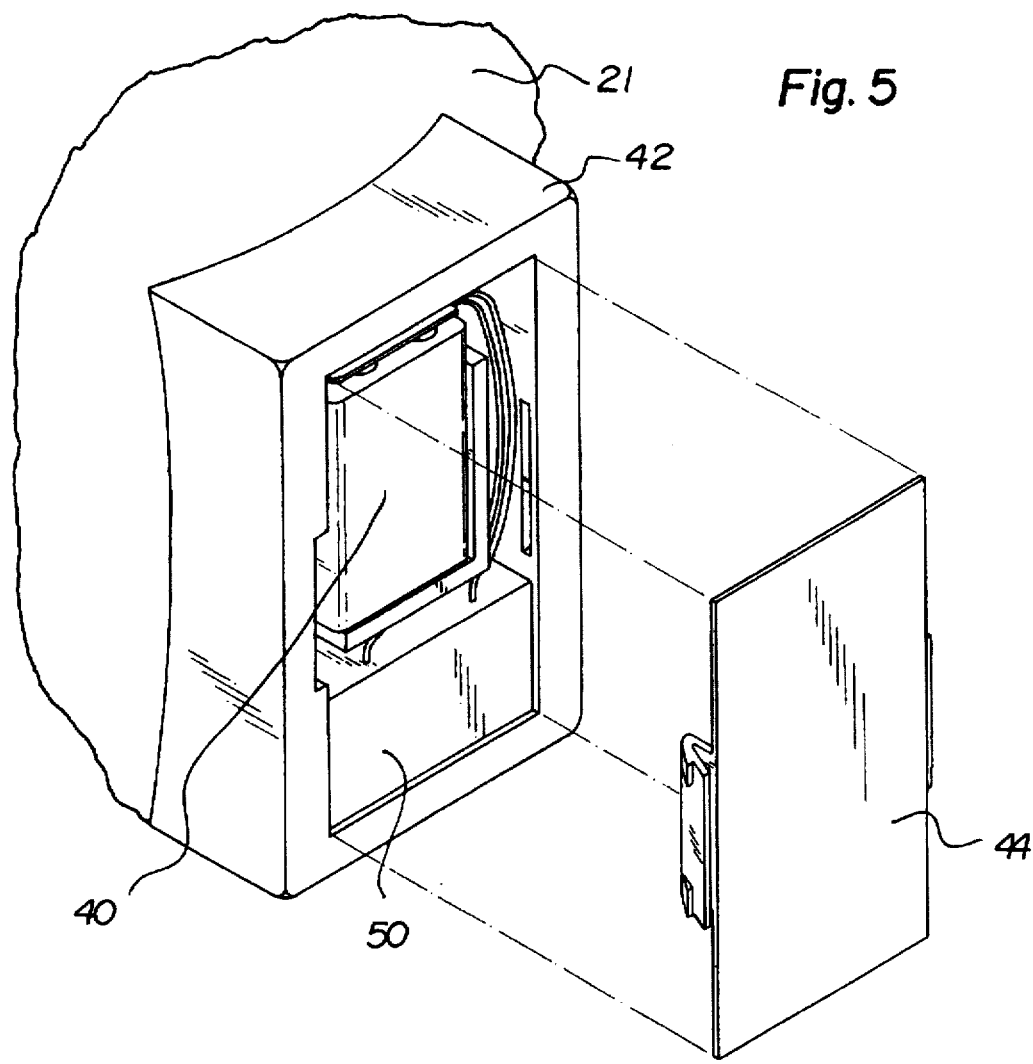
FIG. 5 is an exploded view of the electrical power source and motion switching means.
Figure 6:
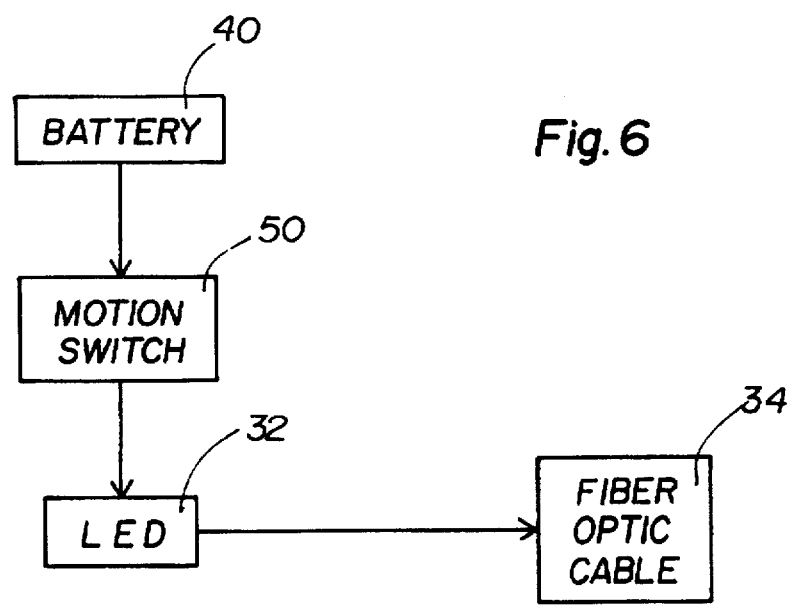
FIG. 6 is a flowchart of the electrical components of the present invention.

With reference now to the drawings, and in particular to FIGS. 1 through 6 thereof, a new Roller Blade Lighting System embodying the principles and concepts of the present invention and generally designated by the reference numeral 10 will be described.

More specifically, it will be noted that the Roller Blade Lighting System 10 comprises a roller blade skate 20, a lighting means 30 integrated within the roller blade skate 20, an electrical power source 40 electrically connected to the lighting means 30, and a motion switching means 50 electronically connected to the electrical power source 40 and electronically connected to the lighting means 30.

As best illustrated in FIGS. 1 through 6, it can be shown that an upper ankle support member 21 engages a wheel support member 24. At least one wheel member 22 is secured to the wheel support member 24 allowing motion of the roller blade skate 20. A braking means 23 is secured to the rear end of the wheel support member 24 allowing the user to stop. At least one fiber optic cable passage 28 extends from the end of the wheel support member 24 securing the braking means 23 to near the opposite end. At least one lighting aperture 26 protrudes into the horizontal side of the wheel support member 24 to the fiber optic cable passage 28. A light emitting diode 32 is connected to a fiber optic cable 34 where the fiber optic cable 34 projects through the fiber optic cable passage 28. The fiber optic cable 34 includes at least one cable aperture 36 in the surface of the fiber optic cable 34 corresponding to the lighting aperture 26 allowing the light transmitted from the light emitting diode 32 through the fiber optic cable 34 to radiate out through the lighting aperture 26. A housing structure 42 is secured to the upper ankle support member 21 sheltering the electrical power source 40 and the motion switching means 50. A housing door 44 is rotatably secured to the housing structure 42 allowing access by the user to the electrical power source 40 and the motion switching means 50.

In use, the user will secure the roller blade skate 20 onto his foot. When the user begins to move, the motion from the movement causes the motion switching means 50 to send an electrical current to the light emitting diode 32. The light emitting diode 32 emits light into the connected fiber optic cable 34. The fiber optic cable 34 retains the passage of the light until the light reaches the cable aperture 36 where the light emanates out through the cable aperture 36 and further projecting through the corresponding lighting aperture 26 in the wheel support member 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An inline skate Lighting System comprising:
   an inline skate;
   a lighting means integrated with said inline skate, said lighting means comprising a light source and a fiber optic cable in optical communication with said light source;
   a wheel support member having at least one fiber optic cable passage therethrough extending from one end of the wheel support member to the opposite end, said fiber optic cable extending through said fiber optical cable passage; at least one lighting aperture extending through the side of the wheel support member into the fiber optic cable passage to permit light from said fiber optic cable to shine out from said wheel support member;
   an electrical power source electrically connected to the lighting means; and
   a motion switching means for sensing motion by said inline skate, said motion switching means being electrically connected to the electrical power source and electrically connected to the lighting means, said motion switching means providing electrical power to said lighting means when said inline skate is in motion and cutting off electrical power from said lighting means when said inline skate is not in motion.

2. The inline skate Lighting System of claim 1, wherein said inline skate includes:

an upper ankle support member;

said wheel support member secured to the upper ankle support member;

at least one wheel member secured to the wheel support member; and a braking means secured to the rear end of the wheel support member.

3. The inline skate Lighting System of claim 1, wherein the light source of said lighting means includes a light emitting diode connected to said fiber optic cable, wherein the fiber optic cable includes at least one aperture in the cladding of the fiber optic cable in alignment with a lighting aperture in said wheel support member.

4. The inline skate Lighting System of claim 1 wherein the electrical power source includes a housing structure secured to the inline skate and a housing door rotatably secured to the housing structure.

5. An inline skate Lighting System comprising:

an inline skate;

a lighting means integrated with said inline skate, said lighting means comprising a light source and a fiber optic cable in optical communication with said light source;

an electrical power source electrically connected to the lighting means; and a motion switching means for sensing motion by said inline skate, said motion switching means being electrically connected to the electrical power source and electrically connected to the lighting means, said motion switching means providing electrical power to said lighting means when said inline skate is in motion and cutting off electrical power from said lighting means when said inline skate is not in motion;

wherein said inline skate includes a wheel support member having at least one fiber optic cable passage therethrough extending from one end of the wheel support member to the opposite end, said fiber optic cable extending through said fiber optic cable passage;

wherein the wheel support member further includes at least one lighting aperture extending through the side of the wheel support member into the fiber optic cable passage to permit light from said fiber optic cable to shine out from said wheel support member;

wherein the light source of said lighting means includes a light emitting diode connected to said fiber optic cable, wherein the fiber optic cable includes at least one aperture in the cladding of the fiber optic cable in alignment with a lighting aperture in said wheel support member; and wherein the electrical power source includes a housing structure secured to the inline skate and a housing door rotatably secured to the housing structure.

\* \* \* \* \*